(12) United States Patent
Nakada et al.

(10) Patent No.: US 11,233,686 B2
(45) Date of Patent: Jan. 25, 2022

(54) RECEPTION APPARATUS AND METHOD FOR CONTROLLING RECEPTION APPARATUS

(71) Applicant: SONY SEMICONDUCTOR SOLUTIONS CORPORATION, Kanagawa (JP)

(72) Inventors: Yutaka Nakada, Kanagawa (JP); Takashi Horiguti, Kanagawa (JP); Hitoshi Sakai, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/972,343

(22) PCT Filed: Apr. 5, 2019

(86) PCT No.: PCT/JP2019/015056
§ 371 (c)(1),
(2) Date: Dec. 4, 2020

(87) PCT Pub. No.: WO2019/239690
PCT Pub. Date: Dec. 19, 2019

(65) Prior Publication Data
US 2021/0243063 A1    Aug. 5, 2021

(30) Foreign Application Priority Data

Jun. 12, 2018  (JP) .............................. JP2018-111506

(51) Int. Cl.
*H04L 27/26*     (2006.01)
*H04L 29/08*     (2006.01)

(52) U.S. Cl.
CPC ........ *H04L 27/2647* (2013.01); *H04L 69/323* (2013.01)

(58) Field of Classification Search
CPC .......................... H04L 27/2647; H04L 69/323
See application file for complete search history.

(56) References Cited

U.S. PATENT DOCUMENTS

2018/0359520 A1* 12/2018 Takahashi .......... H04N 21/4382
2019/0052498 A1*  2/2019 Kim .................... H03M 13/271
(Continued)

FOREIGN PATENT DOCUMENTS

| JP | 2011-135457 A | 7/2011 |
|---|---|---|
| JP | 2017-011488 A | 1/2017 |
| WO | 2016/208139 A1 | 12/2016 |

OTHER PUBLICATIONS

International Search Report and Written Opinion of PCT Application No. PCT/JP2019/015056, dated Jul. 2, 2018, 06 pages of ISRWO.

*Primary Examiner* — Dac V Ha
(74) *Attorney, Agent, or Firm* — Chip Law Group

(57) ABSTRACT

A reception apparatus that decodes a preamble reduces the size of a buffer that holds a decoding result. A holding unit holds a plurality of bits to each of which physical layer pipe identification information is assigned as a physical layer pipe presence/absence bit string. A reception unit receives a predetermined number of physical layer pipes that do not exceed the number of bits of the physical layer pipe presence/absence bit string and the physical layer pipe identification information of each of the predetermined number of physical layer pipes. A setting unit sets the value of the bit corresponding to the received physical layer pipe identification information of the physical layer pipe presence/absence bit string to one of two values, and sets the value of a non-corresponding bit to another of the two values. A decoding processing unit performs processing for decoding the physical layer pipe corresponding to the bit of the one value.

8 Claims, 17 Drawing Sheets

(56) References Cited

U.S. PATENT DOCUMENTS

2020/0252487 A1\* 8/2020 Kwak ..................... H04L 12/18
2021/0120047 A1\* 4/2021 Oh ..................... H04N 21/8456

\* cited by examiner

*FIG. 4*

| L1-Detail INFORMATION | |
|---|---|
| Syntax | No. of Bits |
| L1_Detail_signaling() { | |
|    L1D_version | 4 |
|    L1D_num_rf | 3 |
|    for (L1D_rf_id=1 .. L1D_num_rf) { | |
|       L1D_bonded_bsid | 16 |
|       Reserved | 3 |
|    } | |
|    for (i=0 .. L1B_num_subframes) { | |
|       if (i > 0) { | |
|          L1D_mimo | 1 |
|          L1D_miso | 2 |
|    } | |
|       L1D_num_plp | 6 |
|       for (j=0 .. L1D_num_plp) { | 301 |
|          L1D_plp_id | 6 |
|          L1D_plp_lls_flag | 1 |
|          L1D_plp_layer | 2 |
|          L1D_plp_start | 24 |
|          L1D_plp_size | 24 |
|          if (L1D_num_rf>0) { | |
|             L1D_plp_num_channel_bonded | 3 |
|          } | |
|    } | |
|    L1D_bsid | 16 |
|    L1D_reserved | as needed |
|    L1D_crc | 32 |
| } | |

Brackets on right indicate: SUBFRAME COMMON INFORMATION, PLP COMMON INFORMATION, PLP INDIVIDUAL INFORMATION (UP TO 64), SUBFRAME INDIVIDUAL INFORMATION (UP TO 256), SUBFRAME COMMON INFORMATION

FIG. 12

| L1-Detail INFORMATION | |
|---|---|
| Syntax | No. of Bits |
| L1_Detail_signaling() { | |
|   L1D_version | 4 |
|   L1D_num_rf | 3 |
|   for (L1D_rf_id=1 .. L1D_num_rf) { | |
|     L1D_bonded_bsid | 16 |
|     Reserved | 3 |
|   } | |
|   for (i=0 .. L1B_num_subframes) { | |
|     if (i > 0) { | |
|       L1D_mimo | 1 |
|       L1D_miso | 2 |
|   } | |
|     L1D_num_plp | 6 |
|     for (j=0 .. L1D_num_plp) {    301 | |
|       L1D_plp_id | 6 |
|       L1D_plp_lls_flag | 1 |
|       L1D_plp_layer | 2 |
|       L1D_plp_start | 24 |
|       L1D_plp_size | 24 |
|       if (L1D_num_rf>0) {    302 | |
|         L1D_plp_num_channel_bonded | 3 |
|       } | |
|     } | |
|   } | |
|   L1D_bsid | 16 |
|   L1D_reserved | as needed |
|   L1D_crc | 32 |
| } | |

SUBFRAME COMMON INFORMATION

PLP COMMON INFORMATION

SUBFRAME INDIVIDUAL INFORMATION (UP TO 256)

PLP INDIVIDUAL INFORMATION (UP TO 64)

SUBFRAME COMMON INFORMATION

FIG. 16

| L1-Detail INFORMATION | |
|---|---|
| Syntax | No. of Bits |
| L1_Detail_signaling() { | |
|    L1D_version | 4 |
|    L1D_num_rf | 3 |
|    for (L1D_rf_id=1 .. L1D_num_rf) { | |
|       L1D_bonded_bsid | 16 |
|       Reserved | 3 |
|    } | |
|    for (i=0 .. L1B_num_subframes) { | |
|       if (i > 0) { | |
|          L1D_mimo | 1 |
|          L1D_miso | 2 |
|    } | |
|    L1D_num_plp | 6 |
|    for (j=0 .. L1D_num_plp) { | 301 |
|       L1D_plp_id | 6 |
|       L1D_plp_lls_flag | 1  303 |
|       L1D_plp_layer | 2 |
|       L1D_plp_start | 24 |
|       L1D_plp_size | 24 |
|       if (L1D_num_rf>0) { | 302 |
|          L1D_plp_num_channel_bonded | 3 |
|    } | |
|    L1D_bsid | 16 |
|    L1D_reserved | as needed |
|    L1D_crc | 32 |
| } | |

SUBFRAME COMMON INFORMATION

PLP COMMON INFORMATION (UP TO 256)

PLP INDIVIDUAL INFORMATION (UP TO 64)

SUBFRAME INDIVIDUAL INFORMATION

SUBFRAME COMMON INFORMATION

RECEPTION APPARATUS AND METHOD FOR CONTROLLING RECEPTION APPARATUS

CROSS REFERENCE TO RELATED APPLICATIONS

This application is a U.S. National Phase of International Patent Application No. PCT/JP2019/015056 filed on Apr. 5, 2019, which claims priority benefit of Japanese Patent Application No. JP 2018-111506 filed in the Japan Patent Office on Jun. 12, 2018. Each of the above-referenced applications is hereby incorporated herein by reference in its entirety.

TECHNICAL FIELD

The present technology relates to a reception apparatus and a method for controlling the reception apparatus. More specifically, the present technology relates to a reception apparatus for receiving digital terrestrial broadcasting and a method for controlling the reception apparatus.

BACKGROUND ART

In recent years, development and research on a reception apparatus for receiving next-generation digital terrestrial broadcasting using advanced television systems committee standards (ATSC) 3.0 standard have been advanced. According to the ATSC 3.0 standard, orthogonal frequency division multiplexing (OFDM) frames are transmitted and received. This OFDM frame includes a preamble and up to 256 subframes, and each subframe includes a packet sequence called physical layer pipe (PLP). Up to 64 PLPs can be stored in one subframe, and the identification information, data size, and the like of each stored PLP are stored in the preamble. In order to efficiently process an OFDM frame having this configuration, for example, a reception apparatus has been proposed that includes a control circuit that decodes a preamble and a signal processing unit that decodes a PLP according to the decoding result (see, for example, Patent Document 1).

CITATION LIST

Patent Document

Patent Document 1: Japanese Patent Application Laid-Open No. 2011-135457

SUMMARY OF THE INVENTION

Problems to be Solved by the Invention

In the above-described conventional technique, the control circuit and the signal processing unit can execute the preamble decoding and the PLP decoding in parallel, so that the processing speed can be increased as compared with the configuration in which they are sequentially executed. However, since the signal processing unit performs processing using the decoding result of the control circuit, it is necessary to arrange a holding unit (buffer or the like) that holds the decoding result between the control circuit and the signal processing unit. Then, the more detailed the decoding result, the larger the data size of the decoding result, and the larger the buffer size required. For example, since the maximum number of PLPs in a subframe is 64 ($=2^6$), 6 bits are assigned to the identification information. Therefore, when the control circuit acquires the PLP identification information by decoding and passes it to the signal processing circuit, it is necessary to secure a capacity of 64×6 bits in the holding unit. As described above, the above-described reception apparatus has a problem that the size of the holding unit becomes large according to the decoding result.

The present technology is created in view of such a situation, and an object is to reduce the size of a holding unit that holds a decoding result in a reception apparatus that decodes a preamble.

Solutions to Problems

The present technology has been made to solve the above problems, and a first aspect is a reception apparatus including:

a holding unit that holds a plurality of bits to each of which physical layer pipe identification information is assigned as a physical layer pipe presence/absence bit string; a reception unit that receives a predetermined number of physical layer pipes that do not exceed a number of bits of the physical layer pipe presence/absence bit string and the physical layer pipe identification information of each of the predetermined number of physical layer pipes; a setting unit that sets a value of a bit corresponding to the received physical layer pipe identification information of the physical layer pipe presence/absence bit string to one of two values, and a value of a non-corresponding bit to another of the two values; and a decoding processing unit that performs processing of decoding the physical layer pipe corresponding to the bit of the one value, and a method for controlling the same. Therefore, in a case where the received physical layer pipe identification information is held as it is, the size of the physical layer pipe identification information is required for each physical layer pipe, whereas the size of one bit is required for each physical layer pipe, which has the effect of reducing the size of the holding unit.

Furthermore, in the first aspect, the reception unit may receive a subframe in which the predetermined number of physical layer pipes are stored and a preamble in which the physical layer pipe identification information is stored, and the number of bits of the physical layer pipe presence/absence bit string may be a maximum number of the physical layer pipes stored in the subframe. Therefore, the effect is provided that the physical layer pipe corresponding to the bit of one value in the physical layer pipe presence/absence bit string having the number of bits corresponding to the maximum number of physical layer pipes is decoded.

Furthermore, in the first aspect, the holding unit may further hold a plurality of bits to each of which the physical layer pipe identification information is assigned as a low level signaling (LLS) presence/absence bit string, the reception unit may further receive an LLS flag of each of the predetermined number of physical layer pipes, the setting unit may set a value of a bit corresponding to the physical layer pipe identification information of the physical layer pipe including LLS information of the LLS presence/absence bit string to one of two values, and a value of a non-corresponding bit to another of the two values, and the decoding processing unit may acquire the LLS information from the physical layer pipe corresponding to the bit of the one value in the LLS presence/absence bit string. Therefore, the effect that LLS information is acquired is provided.

Furthermore, in the first aspect, the holding unit may further hold a plurality of bits to each of which the physical layer pipe identification information is assigned as a combination presence/absence bit string, the reception unit may further receive information regarding combination of the predetermined number of physical layer pipes, the setting unit may set a value of a bit corresponding to the physical layer pipe identification information of the physical layer pipe to be combined of the combination presence/absence bit string to one of two values, and a value of a non-corresponding bit to another of the two values, and the decoding processing unit may combine the physical layer pipe corresponding to the bit of the one value in the combination presence/absence bit string. Therefore, the effect that physical layer pipes are combined is provided.

Furthermore, in the first aspect, the holding unit may further hold a plurality of bits to each of which the physical layer pipe identification information is assigned as an extension presence/absence bit string, the reception unit may further receive information regarding layered division multiplexing (LDM), the setting unit may set a value of a bit corresponding to the physical layer pipe identification information of an extended physical layer pipe of the extension presence/absence bit string to one of two values, and a value of a non-corresponding bit to another of the two values, and the decoding processing unit may perform decoding using the LDM on the basis of the extension presence/absence bit string. Therefore, the effect that LDM is used is provided.

Furthermore, the first aspect may further include an interpretation unit that periodically interprets a preamble including the physical layer pipe identification information. Therefore, the effect that a preamble is periodically interpreted is provided.

Furthermore, in the first aspect, the reception unit may receive a frame conforming with advanced television systems committee standards (ATSC) 3.0 standard, and the frame may include a subframe in which the predetermined number of physical layer pipes are stored and a preamble in which the physical layer pipe identification information is stored. Therefore, the effect that a physical layer pipe of the ATSC3.0 standard is decoded is provided.

Effects of the Invention

According to the present technology, in a reception apparatus that decodes a preamble, an excellent effect that the size of a buffer that holds a decoding result can be reduced can be provided. Note that effects described herein are not necessarily limited, but may also be any of those described in the present disclosure.

BRIEF DESCRIPTION OF DRAWINGS

FIG. 4 is a diagram showing an example of a syntax of L1-Detail information according to the first embodiment of the present technology.

FIG. 12 is a diagram showing an example of a storage location of information regarding a PLP combination relationship according to the second embodiment of the present technology.

FIG. 16 is a diagram showing an example of a storage location of information regarding LDM according to the third embodiment of the present technology.

MODE FOR CARRYING OUT THE INVENTION

Aspects for carrying out the present technology (hereinafter, the embodiments) are described below. A description is given in the order described below.

1. First embodiment (example of decoding PLP on the basis of bit string)
2. Second embodiment (example of combining and decoding PLPs on the basis of bit string)
3. Third embodiment (example of decoding PLP while using LDM on the basis of bit string)
4. Fourth embodiment (example of periodically interpreting preamble and decoding PLP on the basis of bit string)

1. First Embodiment

[Configuration Example of Reception Apparatus]

Figure 1:
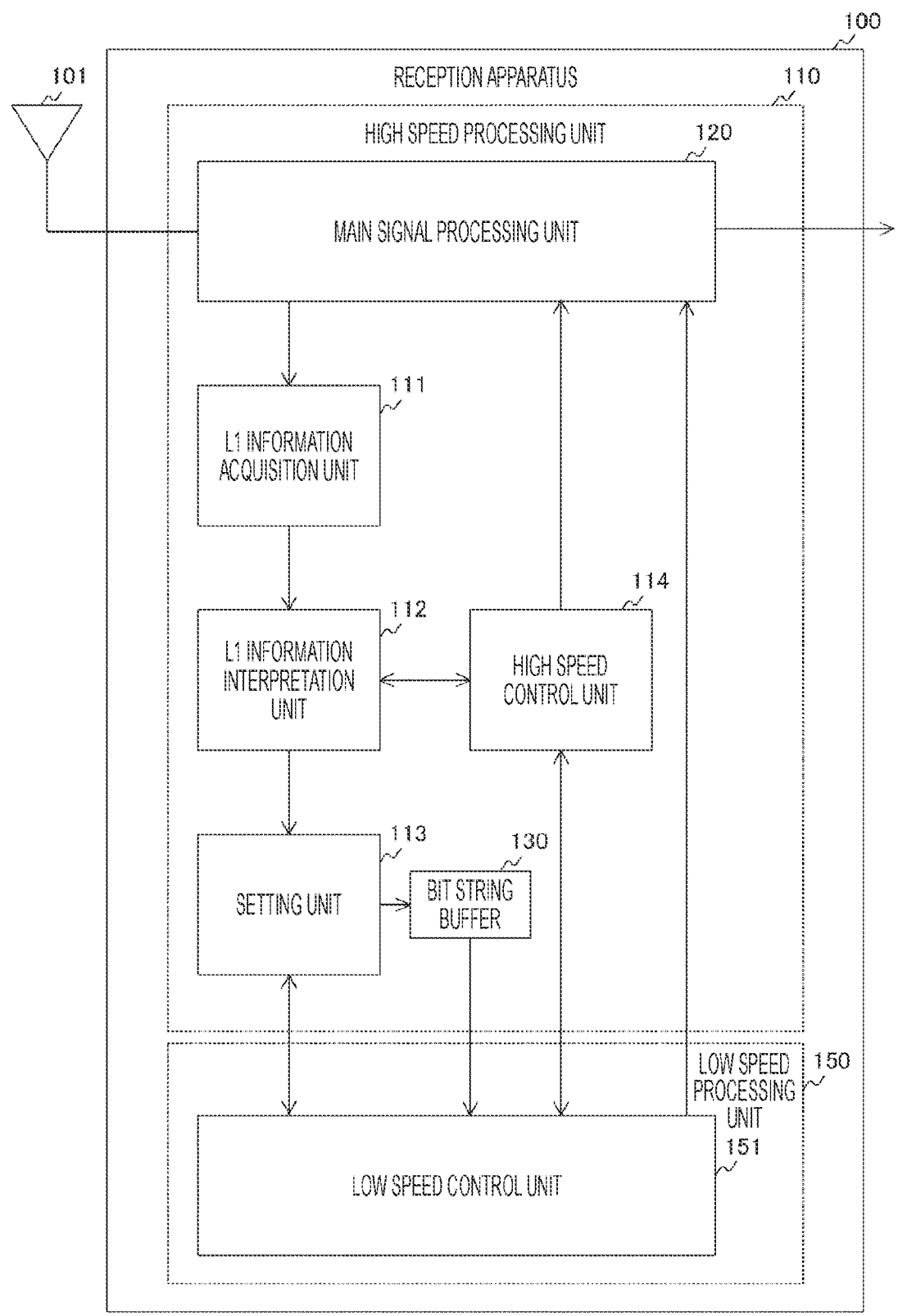
FIG. 1 is a block diagram showing a configuration example of a reception apparatus according to a first embodiment of the present technology.

FIG. 1 is a block diagram showing a configuration example of a reception apparatus 100 according to the first embodiment of the present technology. The reception apparatus 100 is an apparatus for receiving digital terrestrial broadcasting conforming to the ATSC 3.0 standard, and includes an antenna 101, a high speed processing unit 110, and a low speed processing unit 150.

The antenna 101 receives a radio signal on which an OFDM frame is superimposed. Note that the antenna 101 is an example of the reception unit described in the claims.

The high speed processing unit 110 includes hardware such as an integrated circuit (IC) circuit. The high speed processing unit 110 includes a main signal processing unit 120, an L1 (Layer 1) information acquisition unit 111, an L1 information interpretation unit 112, a setting unit 113, a high speed control unit 114, and a bit string buffer 130.

The low speed processing unit 150 is realized by software executed by a central processing unit (CPU) and the like, and includes a low speed control unit 151.

The main signal processing unit 120 performs processing of buffering the OFDM frame and decoding the payload in the OFDM frame under the control of the high speed control unit 114 and the low speed control unit 151. Note that the main signal processing unit 120 is an example of the decoding processing unit described in the claims.

The L1 information acquisition unit 111 acquires L1 information from the OFDM frame. The L1 information acquisition unit 111 decodes a bootstrap and reads the preamble from the OFDM frame buffered in the main signal processing unit 120. In the ATSC3.0 standard, L1 information is stored in the preamble, and this L1 information includes L1-Basic information and L1-Detail information. The L1 information acquisition unit 111 supplies the read L1 information to the L1 information interpretation unit 112.

The L1 information interpretation unit 112 interprets L1 information. Interpretation of the L1 information is performed every time an OFDM frame is received, and when the output of the PLP is stopped, interpretation of the L1 information is executed when the stop is detected. Note that the L1 information interpretation unit 112 is an example of the interpretation unit described in the claims.

Here, the L1-Detail information in the L1 information stores information regarding each subframe in the OFDM frame. For example, information such as multiple-input and multiple-output (MIMO) usage status, fast Fourier transform (FFT) size, and guard interval length is stored for each subframe. Hereinafter, these pieces of information will be referred to as "subframe individual information", and the remaining information will be referred to as "subframe common information".

Furthermore, in the subframe individual information, information regarding each PLP in the subframe is stored. For example, information such as physical layer pipe identification information (PLPID), LLS flag, and PLP size is stored for each PLP. Hereinafter, these pieces of information will be referred to as "PLP individual information", and the remaining information in the subframe individual information will be referred to as "PLP common information".

Every time the subframe individual information is decoded, the L1 information interpretation unit 112 supplies each of the PLP individual information in the subframe individual information to the high speed control unit 114 and the setting unit 113.

The high speed control unit 114 controls the main signal processing unit 120 on the basis of the PLP individual information. The high speed control unit 114 decodes the PLP individual information, acquires information necessary for PLP decoding (PLP size or the like) excluding the PLPID and LLS flag, and supplies the information to the main signal processing unit 120 to decode the PLP. Furthermore, the high speed control unit 114 exchanges the execution status with respect to the low speed control unit 151 and the L1 information interpretation unit 112.

The bit string buffer 130 holds a predetermined bit string. Details of the data structure of the bit string will be described later. Note that the bit string buffer 130 is an example of the holding unit described in the claims.

The setting unit 113 decodes the PLP individual information, acquires the PLPID and the LLS flag, and sets the value in the bit string in the bit string buffer 130 on the basis of them. The details of the setting method will be described later. Furthermore, the setting unit 113 exchanges the execution status with respect to the low speed control unit 151.

The low speed control unit 151 controls the main signal processing unit 120 on the basis of the bit string in the bit string buffer 130. The details of control content will be described later.

Figure 2:
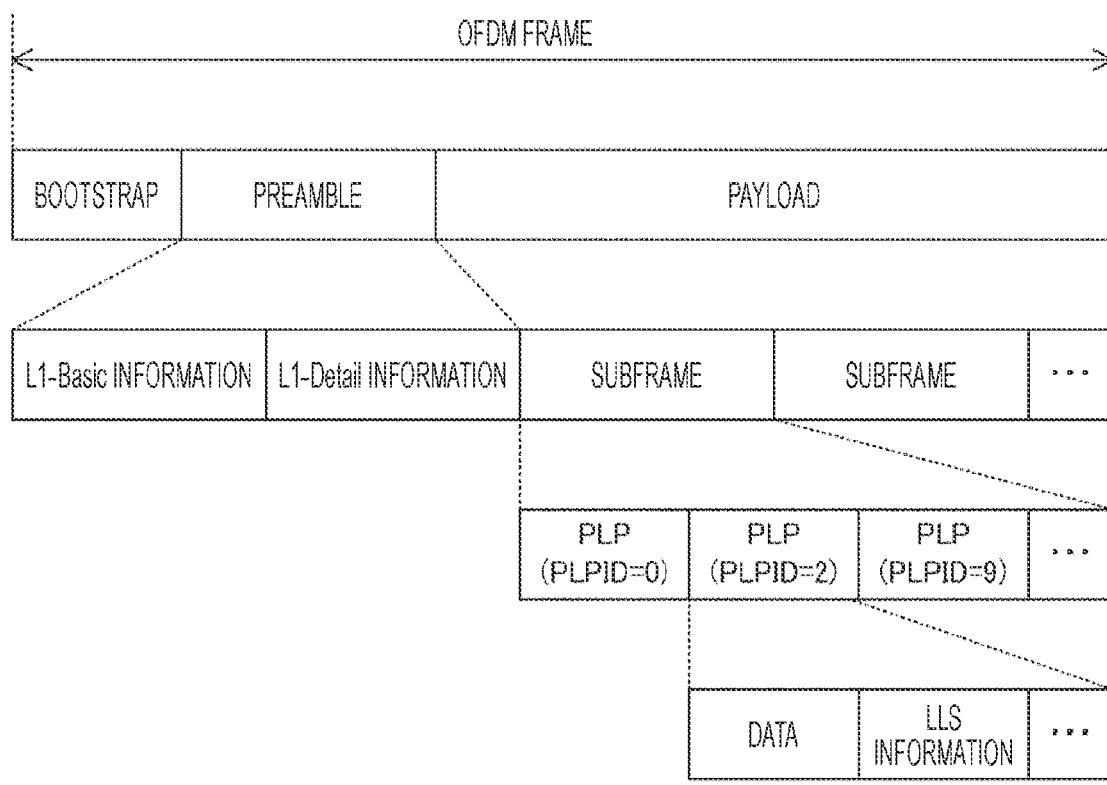
FIG. 2 is a diagram showing an example of a data structure of an OFDM frame according to the first embodiment of the present technology.

FIG. 2 is a diagram showing an example of a data structure of an OFDM frame according to the first embodiment of the present technology. The OFDM frame includes bootstrap, preamble, and payload.

The bootstrap stores version, bandwidth, and preamble structure. The L1-Basic information and the L1-Detail information are stored in the preamble.

The L1-Basic information stores a pilot signal coding method and the like. Details of the L1-Detail information will be described later.

Up to 256 subframes are stored in the payload. Furthermore, up to 64 PLPs are stored in each subframe. Furthermore, content data and LLS information can be stored in the PLP. However, the LLS information is not always stored in all PLPs. An LLS flag indicating whether or not the corresponding PLP includes LLS information is stored in the L1-Detail information.

The LLS information is information of layers (transport layer, application layer, or the like) higher than the physical layer, and includes, for example, channel information indicating a channel corresponding to a stream.

Figure 3:
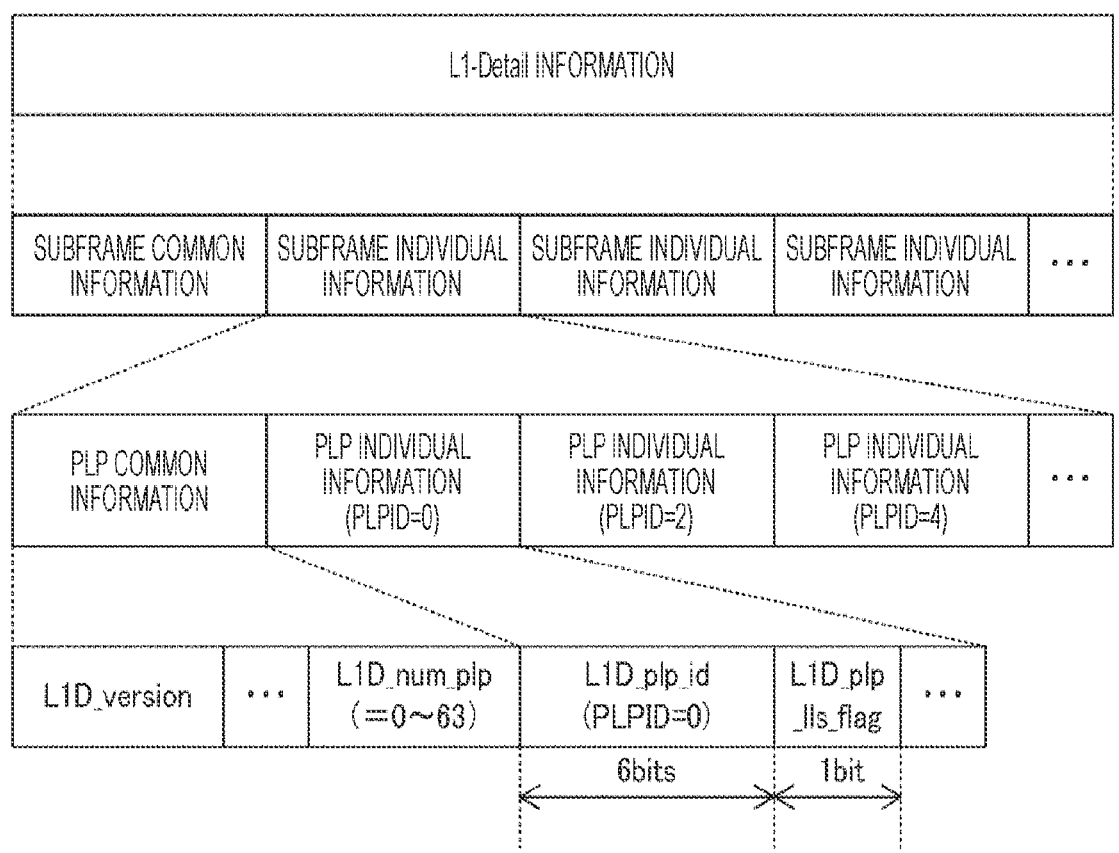
FIG. 3 is a diagram showing an example of a data structure of L1-Detail information according to the first embodiment of the present technology.

FIG. 3 is a diagram showing an example of a data structure of the L1-Detail information according to the first embodiment of the present technology. The L1-Detail information includes subframe common information and up to 256 pieces of subframe individual information.

Furthermore, each piece of subframe individual information includes PLP common information and up to 64 pieces of PLP individual information.

In the PLP common information, "L1D_version" and "L1D_num_plp" indicating the number of PLPs in the subframe are stored. In the PLP individual information, "L1D_plp_id" indicating the PLPID and "L1D_plp_lls_flag" indicating the LLS flag are stored. Six bits are allocated to the PLPID and 1 bit is allocated to the LLS flag.

FIG. 4 is a diagram showing an example of a syntax of the L1-Detail information according to the first embodiment of the present technology. The syntax is described in "ATSC Standard:Physical Layer Protocol Doc. A/322:2017", Advanced Television Systems Committee, Internet (https://www.atsc.org/standards/atsc-3-0-standards/).

In the L1-Detail information, "L1D_version" and "L1D_num_rf" are stored in order from the beginning. "L1D_version" is the version of a L1-Detail signaling structure used for a current frame. "L1D_num_rf" is the number of frequencies involved in channel bonding that is not included in the frequency of the current channel.

Furthermore, "for (i=0 . . . L1B_num_subframes) { . . . }" means that the data in curly brackets is stored for the number of subframes (up to 256). The part outside this for syntax corresponds to the subframe common information. Furthermore, the data within the curly brackets of the for syntax corresponds to the subframe individual information.

In the subframe individual information, "for (j=0 . . . L1D_num_plp) { . . . }" means that the data in the curly brackets is stored for the number of PLPs (up to 64). The information immediately before this for syntax corresponds to the PLP common information. Furthermore, the data in the curly brackets of the for syntax corresponds to PLP individual information.

The 6 bits of the "L1D_plp_id" field in the PLP individual information represent the PLPID, and the 1 bit of the "L1D_plp_lls_flag" field represents the LLS flag. These 7 bits shown by a dotted line 301 are read by the setting unit 113 for each PLP.

Figure 5:
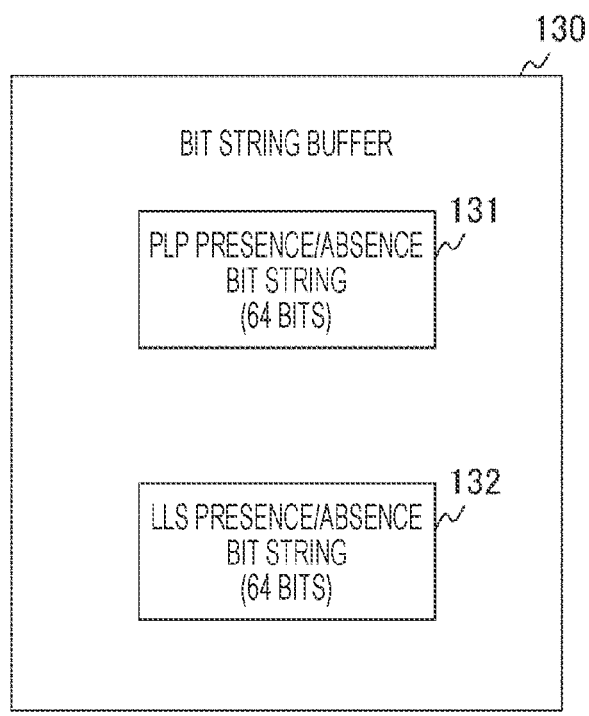
FIG. 5 is a diagram showing an example of data held in a bit string buffer according to the first embodiment of the present technology.

FIG. 5 is a diagram showing an example of data held in the bit string buffer 130 according to the first embodiment of the present technology. The bit string buffer 130 holds a PLP presence/absence bit string 131 and an LLS presence/absence bit string 132.

Figure 6A:
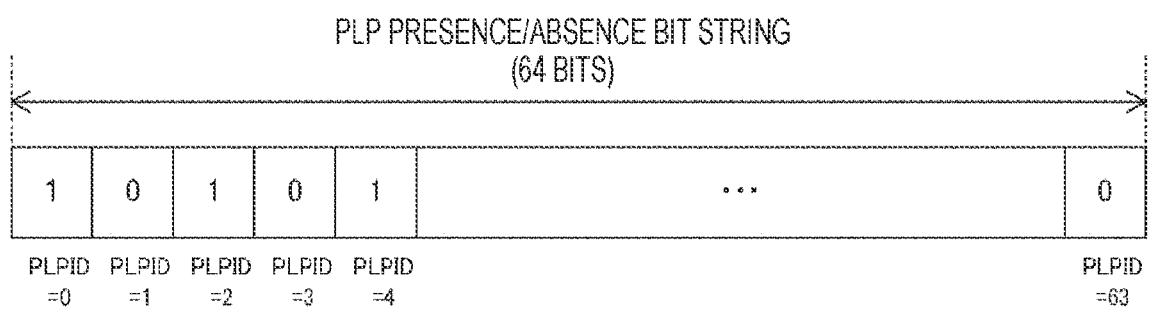
FIGS. 6A and 6B are diagrams showing an example of a data structure of a PLP presence/absence bit string and a low level signaling (LLS) presence/absence bit string according to the first embodiment of the present technology.
Figure 6B:
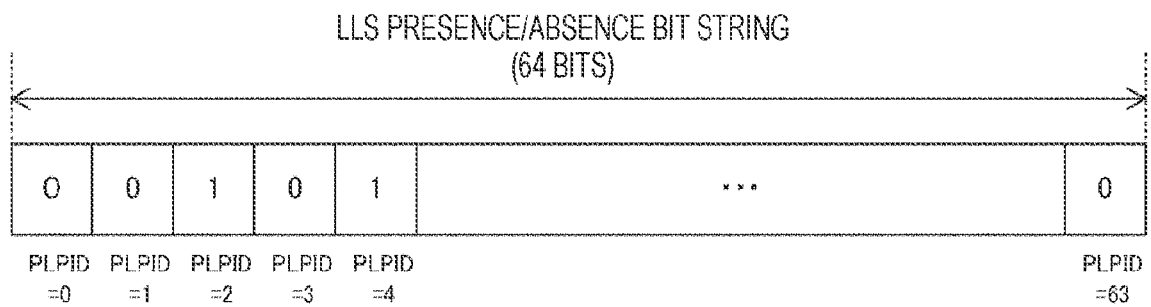

FIGS. 6A and 6B are diagrams showing an example of a data structure of the PLP presence/absence bit string 131 and the LLS presence/absence bit string 132 according to the first embodiment of the present technology. In the drawing, FIG. 6A is a diagram showing an example of the data structure of the PLP presence/absence bit string 131, and FIG. 6B in the drawing is a diagram showing an example of the data structure of the LLS presence/absence bit string 132.

The PLP presence/absence bit string 131 is an array of a plurality of bits to which different PLPIDs are assigned. For example, in the ATSC3.0 standard, up to 64 PLPs are stored for each subframe, and therefore the size of the PLP presence/absence bit string 131 is 64 bits. A PLPID "n" is assigned to the n-th (n is an integer of 0 to 63) bit of the PLP presence/absence bit string 131. Each bit indicates whether or not the PLP of the corresponding PLPID is present in the subframe.

The setting unit 113 decodes the received L1 information and acquires a 6-bit PLPID for each PLP in the subframe. Then, the setting unit 113, in the PLP presence/absence bit string 131, sets the bit corresponding to the acquired PLPID to one of the two values (such as "1"), and the non-corresponding bit to the other of the two values (such as "0"). For example, the setting unit 113 performs setting by initializing all bits of the PLP presence/absence bit string 131 to "0" at the start of decoding the subframe individual information and updating the bit corresponding to the acquired PLPID to "1".

Furthermore, the LLS presence/absence bit string 132 is an array of a plurality of bits to which different PLPIDs are assigned. Since up to 64 PLPs are stored for each subframe, the size of the LLS presence/absence bit string 132 is also 64 bits. A PLPID "n" is assigned to the n-th bit of the LLS presence/absence bit string 132. Each bit indicates whether or not LLS information is included in the PLP of the corresponding PLPID.

The setting unit 113 decodes the received L1 information and acquires a 1-bit LLS flag for each PLP in the subframe. This LLS flag indicates whether or not the corresponding PLP includes LLS information. Then, the setting unit 113, in the LLS presence/absence bit string 132, sets the bit corresponding to the PLPID of the PLP including the LLS information to one of two values (logical value "1" or the like), and the other bits to the other of the two values (logical value "0" or the like). For example, the setting unit 113 performs setting by initializing all bits of the LLS presence/absence bit string 132 to "0" at the start of decoding the subframe individual information and updating the bit corresponding to the PLP including the LLS information to "1".

[Configuration Example of Main Signal Processing Unit]

Figure 7:
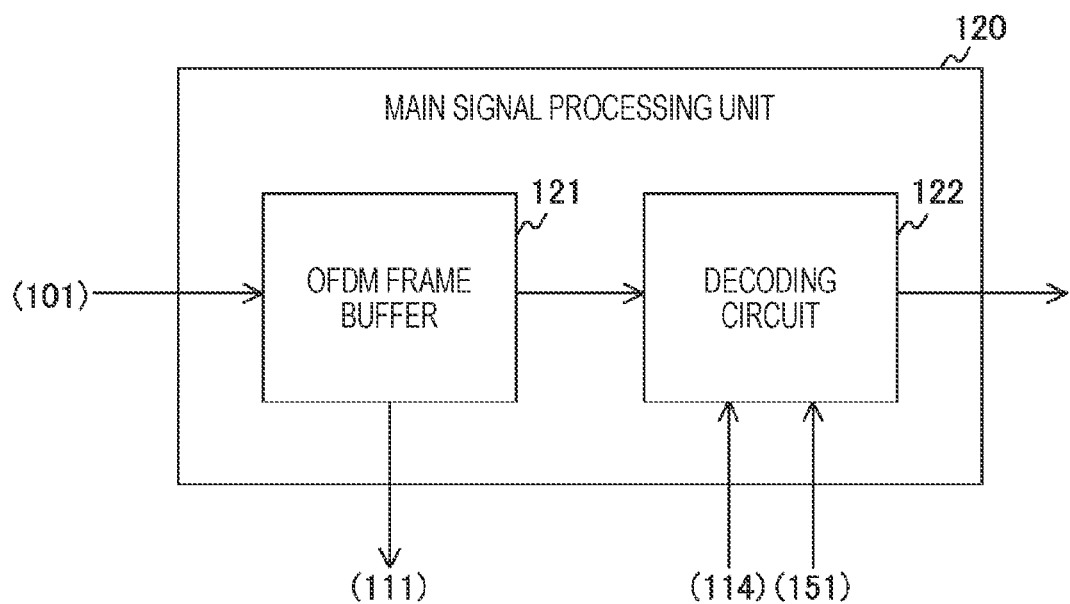
FIG. 7 is a block diagram showing a configuration example of a main signal processing unit according to the first embodiment of the present technology.

FIG. 7 is a block diagram showing a configuration example of the main signal processing unit 120 according to the first embodiment of the present technology. The main signal processing unit 120 includes an OFDM frame buffer 121 and a decoding circuit 122.

The OFDM frame buffer 121 holds an OFDM frame. The decoding circuit 122 is to decode the PLP in the OFDM frame.

The low speed control unit 151 refers to the PLP presence/absence bit string 131 in the bit string buffer 130, and determines whether or not the bit value has the logical value "1" in order from the first bit. In the case of the logical value "1", the low speed control unit 151 transmits a decoding instruction signal to the decoding circuit 122.

Each time the decoding circuit 122 receives a decoding instruction signal, the decoding circuit 122 uses information (encoding method, PLP size, or the like) from the high speed control unit 114 to decode the PLP in the subframe at the physical layer level.

Furthermore, the low speed control unit 151 refers to the LLS presence/absence bit string 132 in the bit string buffer 130, and determines whether or not the bit value has the logical value "1" in order from the first bit. In the case of the logical value "1", the low speed control unit 151 transmits an LLS acquisition instruction signal to the decoding circuit 122.

Upon receiving the LLS acquisition instruction signal, the decoding circuit 122 extracts LLS information from a layer (L2 or L3) higher than the physical layer in the decoded PLP. For example, when extracting the information of L2, the decoding circuit 122 decodes the L2 header in the decoded data of PLP to acquire the structure of the payload of L2. Furthermore, when extracting the L3 information, the decoding circuit 122 decodes the L3 header in the payload of L2 to acquire the structure of the payload of L3. The decoding circuit 122 outputs the acquired LLS information to the outside.

Here, a comparative example is assumed in which the setting unit 113 is not arranged and the high speed control unit 114 holds 7 bits indicating the PLPID and the LLS flag in the buffer. In the comparative example, since the maximum number of PLPs for each subframe is 64, it is necessary to secure a capacity of 64×7 bits in the buffer.

On the other hand, in the reception apparatus 100, since the setting unit 113 sets the PLP presence/absence bit string 131 and the LLS presence/absence bit string 132, the capacity of the bit string buffer 130 can be reduced to 64×2 bits as compared with the comparative example. Furthermore, the communication amount of the interface between the high speed processing unit 110 and the low speed processing unit 150 can be reduced.

[Operation Example of Reception Apparatus]

Figure 8:
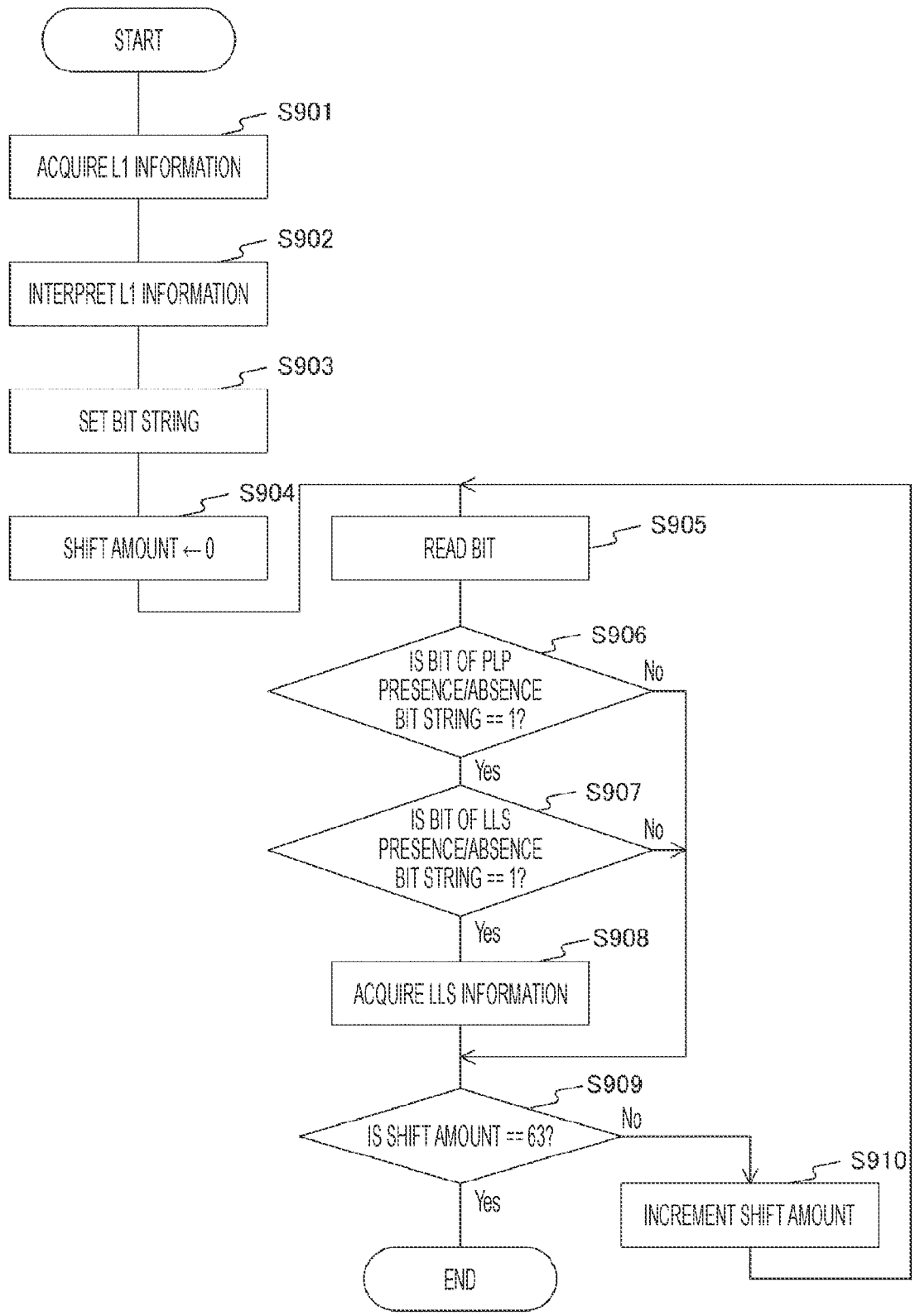
FIG. 8 is a flowchart showing an example of an operation of the reception apparatus according to the first embodiment of the present technology.

FIG. 8 is a flowchart showing an example of an operation of the reception apparatus 100 according to the first embodiment of the present technology. This operation is started, for example, when an application for receiving an OFDM frame is executed.

The reception apparatus 100 acquires the L1 information (step S901) and interprets the L1 information (step S902). Furthermore, the setting unit 113 in the reception apparatus 100 sets the values of the PLP presence/absence bit string and the LLS presence/absence bit string on the basis of the PLPID and the LLS flag (step S903).

The low speed control unit 151 in the reception apparatus 100 initializes a variable indicating the shift amount to "0" (step S904). Then, the low speed control unit 151 reads the bit at the position shifted by the shift amount from the first bit of each of the PLP presence/absence bit string and the LLS presence/absence bit string (step S905). The low speed control unit 151 determines whether or not the bit at the shift position of the PLP presence/absence bit string has the logical value "1" (step S906).

In a case where the bit at the shift position has the logical value "1" (step S906: Yes), the low speed control unit 151 determines whether or not the bit at the shift position of the LLS presence/absence bit string has the logical value "1" (step S907).

In a case where the bit at the shift position has the logical value "1" (step S907: Yes), the low speed control unit 151 instructs the main signal processing unit 120 to acquire LLS information, and the main signal processing unit 120 acquires the LLS information from the corresponding PLP (step S908). The low speed control unit 151 determines whether or not the shift amount is "63" (step S909).

In a case where the bit at the shift position of the PLP presence/absence bit string is not the logical value "1" (step S906: No), or in a case where the bit at the shift position of the LLS presence/absence bit string is not the logical value "1" (step S907: No), the step S909 is executed.

In a case where the shift amount is "63" (step S909: Yes), the reception apparatus 100 executes similar processing for the remaining subframes and ends the reception processing of the OFDM frame.

On the other hand, in a case where the shift amount is not "63" (step S909: No), the low speed control unit 151 increments the shift amount and repeats step S905 and subsequent steps.

As described above, in the first embodiment of the present technology, the bit string buffer 130 holds the PLP presence/absence bit string in which PILID is assigned to each bit, and the setting unit 113 sets the bit corresponding to the PLPID received in the PLP presence/absence bit string to "1". Therefore, in a case where the PLPID of the received PLP is held as it is, the size of the PLPID is required for each PLP, whereas in the PLP presence/absence bit string, the size of 1 bit is required for each PLP, and the buffer size can be reduced.

2. Second Embodiment

In the above-described first embodiment, the reception apparatus 100 decodes each PLP without combining the PLPs. However, in a configuration in which the PLPs are not combined, it may not be possible to maximize the use efficiency of the frequency band. The reception apparatus of the second embodiment is different from that of the first embodiment in that PLPs belonging to different frequency bands (in other words, channels) are combined with each other.

Figure 9:
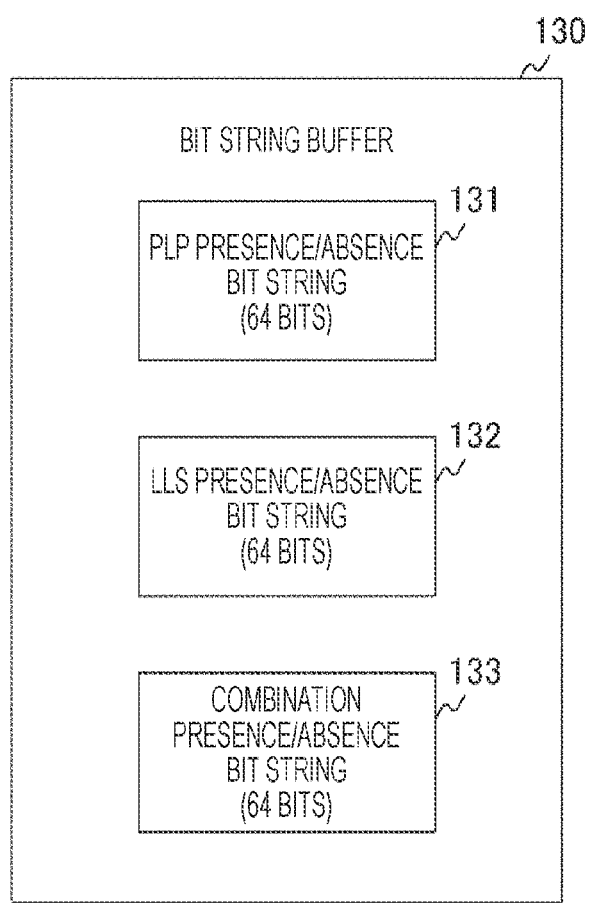
FIG. 9 is a diagram showing an example of data held in a bit string buffer according to a second embodiment of the present technology.

FIG. 9 is a diagram showing an example of data held in the bit string buffer 130 according to the second embodiment of the present technology. The bit string buffer 130 according to the second embodiment further holds a combination presence/absence bit string 133.

Figure 10:
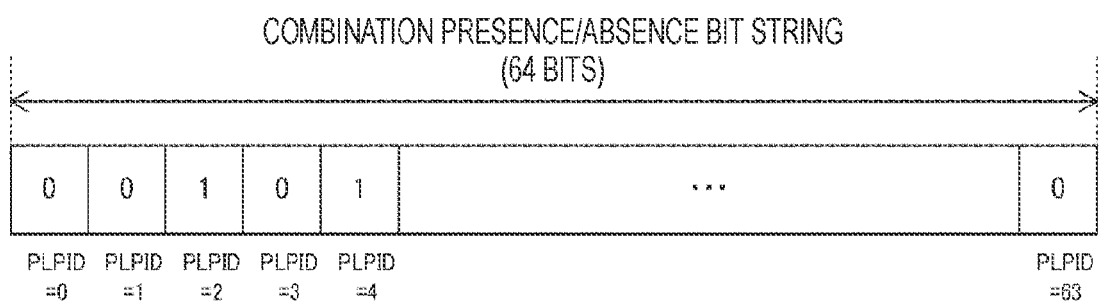
FIG. 10 is a diagram showing an example of a data structure of a combination presence/absence bit string according to the second embodiment of the present technology.

FIG. 10 is a diagram showing an example of a data structure of the combination presence/absence bit string 133 according to the second embodiment of the present technology.

The combination presence/absence bit string 133 is an array of a plurality of bits to which different PLPIDs are assigned. For example, in the ATSC3.0 standard, up to 64 PLPs are stored for each subframe, and therefore the size of the combination presence/absence bit string 133 is 64 bits. A PLPID "n" is assigned to the n-th bit of the combination presence/absence bit string 133. Each bit indicates whether or not the PLP of the corresponding PLPID is combined with another PLP.

The setting unit 113 decodes the received L1 information and acquires information regarding PLP combination for each PLP in the subframe. Then, the setting unit 113, in the combination presence/absence bit string 133, sets the bit corresponding to the PLPID of combined PLPs to one of the two values (such as "1"), and the non-corresponding bit to the other of the two values (such as "0").

The low speed control unit 151 refers to the combination presence/absence bit string 133, and determines whether or not the bit value is the logical value "1" in order from the first bit. In the case of the logical value "1", the low speed control unit 151 supplies a combining instruction signal to the decoding circuit 122.

The decoding circuit 122 combines a plurality of PLPs into one codeword according to the combining instruction signal, and decodes the codeword using information (encoding method, PLP size, or the like) from the high speed control unit 114. Therefore, the decoding circuit 122 can decode more codewords than in the case where they are not combined.

Figure 11:
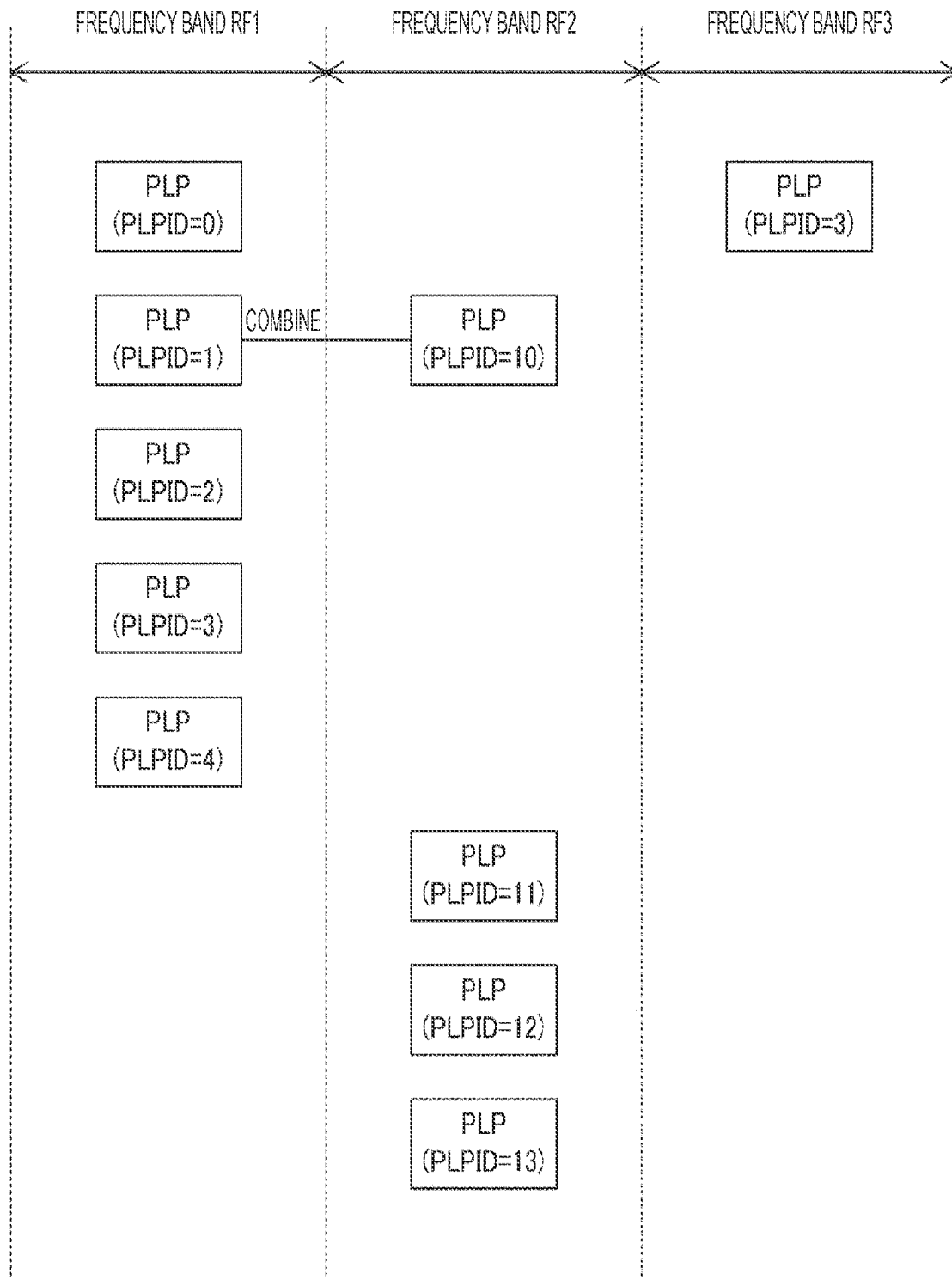
FIG. 11 is a diagram for explaining a PLP combination relationship according to the second embodiment of the present technology.

FIG. 11 is a diagram for explaining a PLP combination relationship according to the second embodiment of the present technology. In the ATSC3.0 standard, PLPs belonging to different frequency bands can be combined. For example, a PLP having a PLPID of "1" in the frequency band RF1 and a PLP having a PLPID of "10" in the frequency band RF2 can be combined.

FIG. 12 is a diagram showing an example of a storage location of information regarding a PLP combination relationship according to the second embodiment of the present technology. In the L1-Detail information, a field of "L1D_plp_num_channel_bonded" is provided in "for (j=0 . . . L1D_num_plp) { . . . }" as indicated by a dotted line 302. This field stores 3-bit information regarding PLP combination. For example, in a case where the corresponding PLP is not combined with the PLPs of other channels, "0" is set in the "L1D_plp_num_channel_bonded" field. On the other hand, in a case where they are combined, a value of "1" or more is set in the field.

Since the field of "L1D_plp_num_channel_bonded" is 3 bits, it is necessary to secure a capacity of 64×3 bits in a case where the 3 bits are held in the bit string buffer 130 for each PLP as they are. On the other hand, since the setting unit 113 according to the second embodiment sets the combination presence/absence bit string 133, it is possible to reduce the capacity for holding information regarding the combination to 64 bits. Furthermore, the communication amount of the interface between the high speed processing unit 110 and the low speed processing unit 150 can be reduced.

Note that although the bit string buffer 130 holds both the LLS presence/absence bit string 132 and the combination presence/absence bit string 133, it is not limited to this configuration. For example, in a case where acquisition of LLS information is unnecessary, the LLS presence/absence bit string 132 may not be held.

As described above, according to the second embodiment of the present technology, the reception apparatus 100 combines PLPs of different channels and decodes them, and therefore it is possible to maximize the use efficiency of the frequency band.

3. Third Embodiment

In the above-described second embodiment, the reception apparatus 100 does not use LDM, but it is expected that LDM will improve the transmission efficiency. The reception apparatus of the third embodiment differs from that of the second embodiment in that LDM is used.

Figure 13:
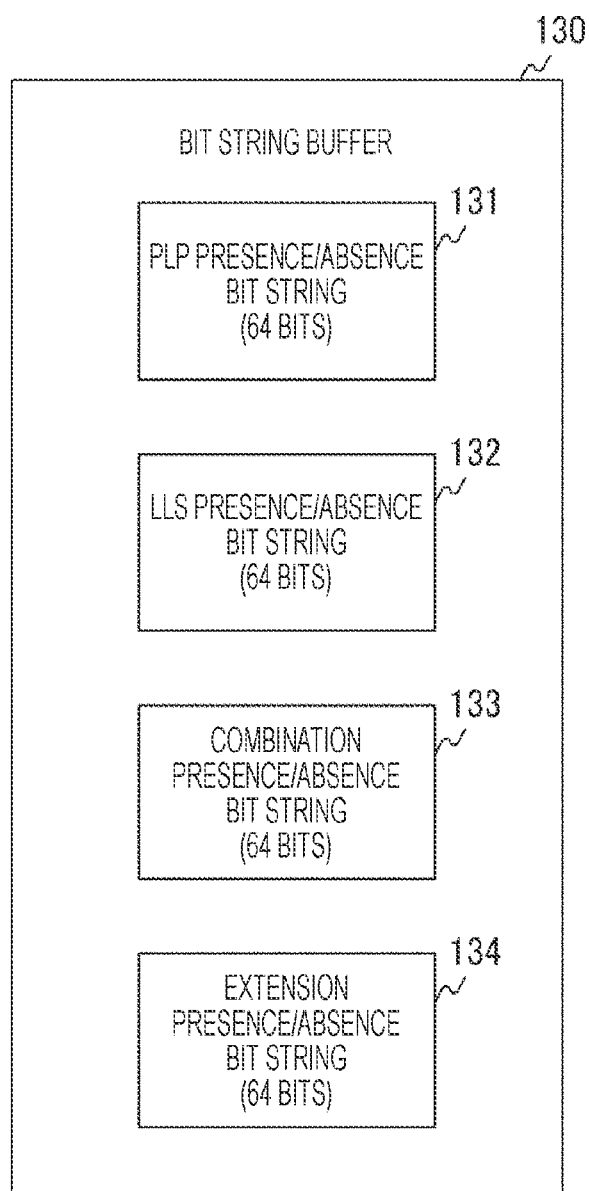
FIG. 13 is a diagram showing an example of data held in a bit string buffer according to a third embodiment of the present technology.

FIG. 13 is a diagram showing an example of data held in the bit string buffer 130 according to the third embodiment of the present technology. The bit string buffer 130 according to the third embodiment further holds an extension presence/absence bit string 134.

Figure 14:
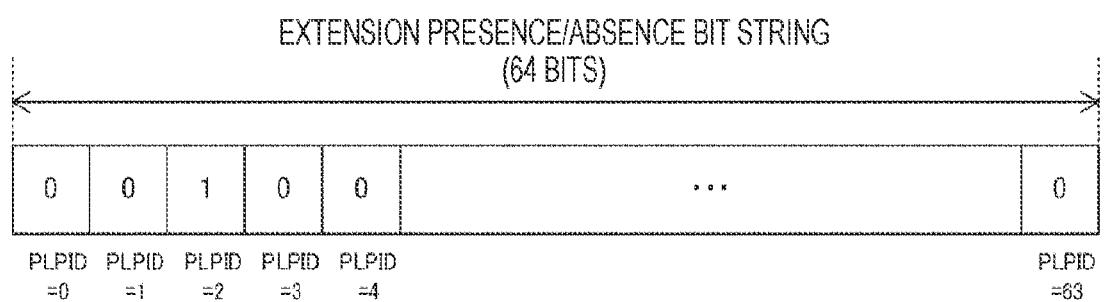
FIG. 14 is a diagram showing an example of a data structure of an extension presence/absence bit string according to the third embodiment of the present technology.

FIG. 14 is a diagram showing an example of a data structure of the extension presence/absence bit string 134 according to the third embodiment of the present technology.

The extension presence/absence bit string 134 is an array of a plurality of bits to which different PLPIDs are assigned. For example, in the ATSC3.0 standard, up to 64 PLPs are stored for each subframe, and therefore the size of the extension presence/absence bit string 134 is 64 bits. A PLPID "n" is assigned to the n-th bit of the extension presence/absence bit string 134. Each bit indicates whether the PLP of the corresponding PLPID is an extension PLP or a core PLP.

Here, in ATSC3.0, in a case where LDM is used, the PLP in a subframe is classified into the core PLP and the extension PLP. Furthermore, the physical layer is divided and multiplexed into a core layer and an extension layer. The core PLP belongs to the core layer, and the extension PLP belongs to the extension layer. In a case where LDM is used, one or more extension layers must exist. On the other hand, in a case where LDM is not used, it is assumed that the extension layer does not exist. The core PLP is associated with one or more extension PLPs, and the extension PLP corresponding to the core PLP belongs to one time interleaving group. That is, the core PLP and the extension PLP are collectively interleaved by a time interleaver on the transmission side and transmitted. Therefore, it is expected that the transmission efficiency is improved as compared to the case where LDM is not used.

The setting unit 113 decodes the received L1 information and acquires information regarding LDM for each PLP in the subframe. Then, the setting unit 113, in the extension presence/absence bit string 134, sets the bit corresponding to the PLPID of the extension PLP to one of the two values (such as "1"), and the non-corresponding bit to the other of the two values (such as "0").

The low speed control unit 151 refers to the extension presence/absence bit string 134, and determines whether or not the bit value is the logical value "1" in order from the first bit. In the case of the logical value "1", the low speed control unit 151 supplies an extension instruction signal to the decoding circuit 122.

The decoding circuit 122 uses the LDM in accordance with the extension instruction signal and collectively deinterleaves the core PLP and the extension PLP.

Figure 15:
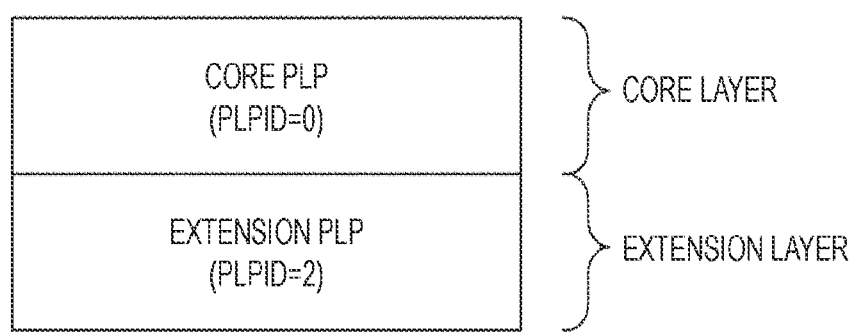
FIG. 15 is a diagram showing a usage example of layered division multiplexing (LDM) according to the third embodiment of the present technology.

FIG. 15 is a diagram showing a usage example of LDM according to the third embodiment of the present technology. A PLP having a PLPID of "0" is a core PLP belonging to the core layer. On the other hand, a PLP having a PLPID of "2" is an extension layer belonging to the extension layer. These PLPs belong to one time interleaving group.

FIG. 16 is a diagram showing an example of a storage location of information regarding LDM according to the third embodiment of the present technology. In the L1-Detail information, a field of "L1D_plp_layer" is provided within "for (j=0 . . . L1D_num_plp) { . . . }" as indicated by a dotted line 303. This field stores 2-bit information regarding LDM. For example, in a case where the corresponding PLP is a core PLP belonging to the core layer, "0" is set in the "L1D_plp_layer" field. On the other hand, in the case of an extension PLP belonging to the extension layer, a value of "1" or more is set in the "L1D_plp_layer" field.

Since the field of "L1D_plp_layer" is 2 bits, it is necessary to secure a capacity of 64×2 bits in a case where the 2 bits are held in the bit string buffer 130 for each PLP as they are. On the other hand, since the setting unit 113 according to the third embodiment sets the extension presence/absence bit string 134, it is possible to reduce the capacity for holding information regarding the LDM to 64 bits. Furthermore, the communication amount of the interface between the high speed processing unit 110 and the low speed processing unit 150 can be reduced.

Note that although the reception apparatus 100 causes the bit string buffer 130 to hold the LLS presence/absence bit string 132, the combination presence/absence bit string 133, and the extension presence/absence bit string 134, it is not limited to this configuration. For example, in a case where acquisition of LLS information is unnecessary, the LLS presence/absence bit string 132 may not be held. Furthermore, in a case where there is no PLP to be combined, the combination presence/absence bit string 133 may not be held.

As described above, according to the third embodiment of the present technology, since the reception apparatus uses LDM, it is expected that the transmission efficiency will be improved as compared with the case where LDM is not used.

4. Fourth Embodiment

In the above-described first embodiment, when the PLP output is stopped, the reception apparatus 100 starts interpreting the L1 information when the stop is detected, but in this configuration, there is a possibility that the time from the PLP output stop to restoration may be long. The reception apparatus 100 of the fourth embodiment differs from that of the first embodiment in that the time to the restoration is shortened by periodically interpreting the L1 information.

Figure 17A:
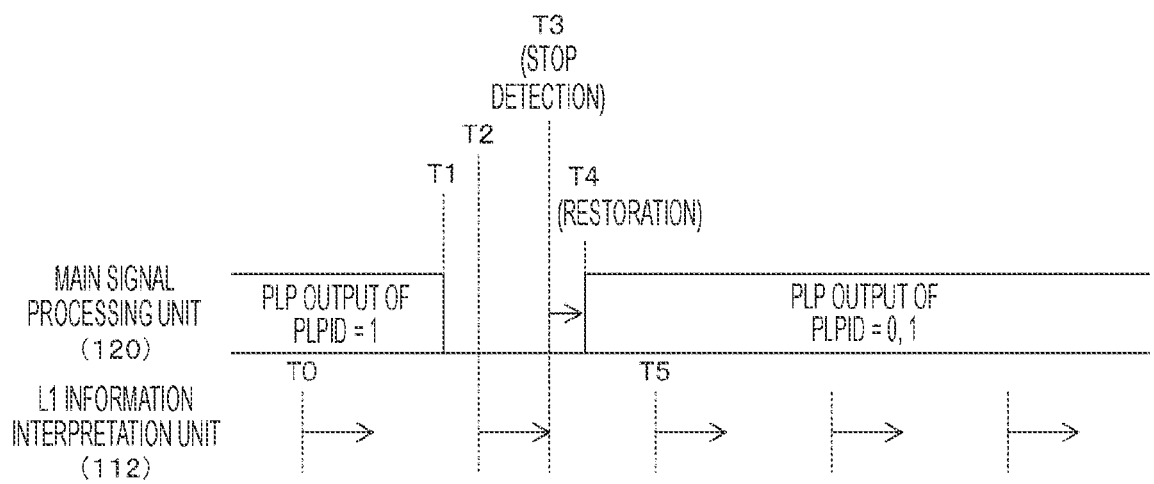
FIGS. 17A and 17B are timing charts showing an example of an operation of the reception apparatus according to a fourth embodiment and the first embodiment of the present technology.
Figure 17B:
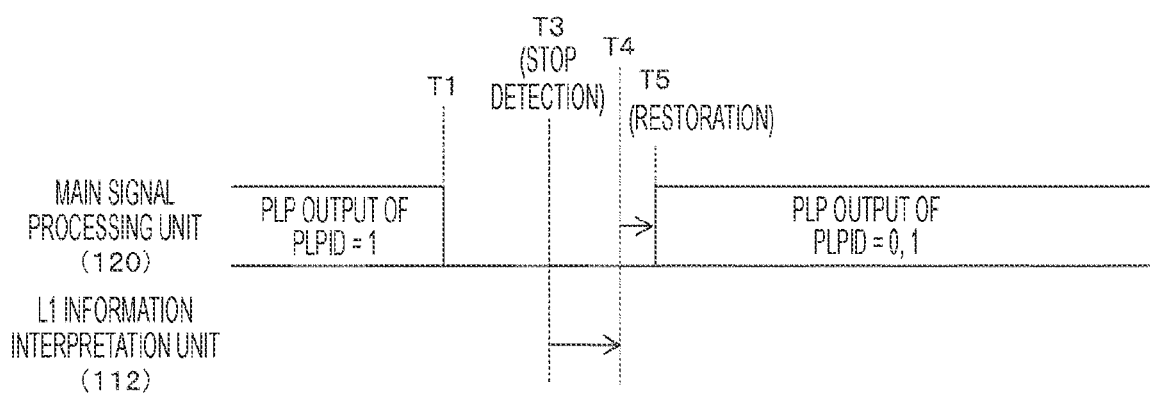

FIGS. 17A and 17B are timing charts showing an example of an operation of the reception apparatus 100 according to the fourth embodiment and the first embodiment of the present technology. In the drawing, FIG. 17A is a timing chart showing an example of the operation of the reception apparatus 100 according to the fourth embodiment. In the drawing, FIG. 17B is a timing chart showing an example of the operation of the reception apparatus 100 according to the first embodiment.

The L1 information interpretation unit 112 of the fourth embodiment periodically interprets the L1 information in the preamble. For example, interpretation of L1 information is started at timing T0, T2, or T5.

It is assumed that the main signal processing unit 120, for example, outputs the PLP over a period to the timing T1 after the timing T0, and the output is interrupted for some reason at the timing T1.

It takes a certain period of time to detect the output stop, and for example, it is assumed that the output stop is detected at the timing T3 after the timing T2 at which the interpretation of the L1 information is ended. Since the interpretation of the L1 information has been ended, the main signal processing unit 120 can immediately resume decoding and can be restored at timing T4.

On the other hand, the L1 information interpretation unit 112 of the first embodiment starts the interpretation of the L1 information when detecting the stop at the timing T3, and the main signal processing unit 120 restarts the decoding at the timing T4 when the interpretation ends and can be restored at the timing T5.

By periodically interpreting the L1 information as in the above-described fourth embodiment, the time to restoration can be shortened in the case where the interpretation of the L1 information has been ended when the output stop of the PLP is detected, for example.

Note that the configurations of the second embodiment and the third embodiment can be applied to the fourth embodiment.

As described above, according to the fourth embodiment of the present technology, the reception apparatus 100 periodically interprets the L1 information, and thus the time from the stop of the output of the PLP to the restoration can be shortened.

Note that the embodiments described above are examples for embodying the present technology, and matters in the embodiments each have a corresponding relationship with invention-specifying matters in the claims. Similarly, the invention-specifying matters in the claims each have a corresponding relationship with matters in the embodiments of the present technology denoted by the same names. However, the present technology is not limited to the embodiments, and can be embodied by subjecting the embodiments to various variation in the scope without departing from the spirit.

Furthermore, the processing sequences described in the embodiments described above may be regarded as a method having a series of sequences or may be regarded as a program for causing a computer to execute the series of sequences or a recording medium storing the program. As the recording medium, for example, a Compact Disc (CD), a MiniDisc (MD), and a Digital Versatile Disc (DVD), a memory card, a Blu-ray (registered trademark) Disc, and the like can be used.

Note that the effects described in the present description are merely illustrative and are not limitative, and other effects may be provided.

Note that the present technology may be configured as below.

(1) A reception apparatus including:
a holding unit that holds a plurality of bits to each of which physical layer pipe identification information is assigned as a physical layer pipe presence/absence bit string;
a reception unit that receives a predetermined number of physical layer pipes that do not exceed a number of bits of the physical layer pipe presence/absence bit string and the physical layer pipe identification information of each of the predetermined number of physical layer pipes;
a setting unit that sets a value of a bit corresponding to the received physical layer pipe identification information of the physical layer pipe presence/absence bit string to one of two values, and a value of a non-corresponding bit to another of the two values; and
a decoding processing unit that performs processing of decoding the physical layer pipe corresponding to the bit of the one value.

(2) The reception apparatus according to (1), in which
the reception unit receives a subframe in which the predetermined number of physical layer pipes are stored and a preamble in which the physical layer pipe identification information is stored, and
the number of bits of the physical layer pipe presence/absence bit string is a maximum number of the physical layer pipes stored in the subframe.

(3) The reception apparatus according to (1) or (2), in which
the holding unit further holds a plurality of bits to each of which the physical layer pipe identification information is assigned as a low level signaling (LLS) presence/absence bit string,
the reception unit further receives an LLS flag of each of the predetermined number of physical layer pipes,
the setting unit sets a value of a bit corresponding to the physical layer pipe identification information of the physical layer pipe including LLS information of the LLS presence/absence bit string to one of two values, and a value of a non-corresponding bit to another of the two values, and
the decoding processing unit acquires the LLS information from the physical layer pipe corresponding to the bit of the one value in the LLS presence/absence bit string.

(4) The reception apparatus according to any of (1) to (3), in which
the holding unit further holds a plurality of bits to each of which the physical layer pipe identification information is assigned as a combination presence/absence bit string,
the reception unit further receives information regarding combination of the predetermined number of physical layer pipes,
the setting unit sets a value of a bit corresponding to the physical layer pipe identification information of the physical layer pipe to be combined of the combination presence/absence bit string to one of two values, and a value of a non-corresponding bit to another of the two values, and
the decoding processing unit combines the physical layer pipe corresponding to the bit of the one value in the combination presence/absence bit string.

(5) The reception apparatus according to any of (1) to (4), in which
the holding unit further holds a plurality of bits to each of which the physical layer pipe identification information is assigned as an extension presence/absence bit string,
the reception unit further receives information regarding layered division multiplexing (LDM),
the setting unit sets a value of a bit corresponding to the physical layer pipe identification information of an extended physical layer pipe of the extension presence/absence bit string to one of two values, and a value of a non-corresponding bit to another of the two values, and
the decoding processing unit performs decoding using the LDM on the basis of the extension presence/absence bit string.

(6) The reception apparatus according to any of (1) to (5), further including:
an interpretation unit that periodically interprets a preamble including the physical layer pipe identification information.

(7) The reception apparatus according to any of (1) to (6), in which
the reception unit receives a frame conforming with advanced television systems committee standards (ATSC) 3.0 standard, and
the frame includes a subframe in which the predetermined number of physical layer pipes are stored and a preamble in which the physical layer pipe identification information is stored.

(8) A method for controlling a reception apparatus, the method including:
a reception procedure of receiving a predetermined number of physical layer pipes that do not exceed a number of bits of a physical layer pipe presence/absence bit string and the physical layer pipe identification information of each of the predetermined number of physical layer pipes;

a setting procedure of setting a value of a bit corresponding to the received physical layer pipe identification information of the physical layer pipe presence/absence bit string held in a holding unit that holds a plurality of bits to each of which physical layer pipe identification information is assigned as the physical layer pipe presence/absence bit string to one of two values, and a value of a non-corresponding bit to another of the two values; and a decoding processing procedure of performing processing of decoding the physical layer pipe corresponding to the bit of the one value.

REFERENCE SIGNS LIST

100 Reception apparatus
101 Antenna
110 High speed processing unit
111 L1 information acquisition unit
112 L1 information interpretation unit
113 Setting unit
114 High speed control unit
120 Main signal processing unit
121 OFDM frame buffer
122 Decoding circuit
130 Bit string buffer
131 PLP presence/absence bit string
132 LLS presence/absence bit string
133 Combination presence/absence bit string
134 Extension presence/absence bit string
150 Low speed processing unit
151 Low speed control unit

The invention claimed is:

1. A reception apparatus comprising:
a holding unit that holds a plurality of bits to each of which physical layer pipe identification information is assigned as a physical layer pipe presence/absence bit string;
a reception unit that receives a predetermined number of physical layer pipes that do not exceed a number of bits of the physical layer pipe presence/absence bit string and the physical layer pipe identification information of each of the predetermined number of the physical layer pipes;
a setting unit that sets a value of a bit corresponding to the physical layer pipe identification information of the physical layer pipe presence/absence bit string to one of two values, and a value of a non-corresponding bit to another of the two values; and
a decoding processing unit that performs processing of decoding a physical layer pipe of the physical layer pipes corresponding to the bit of the one of the two values.

2. The reception apparatus according to claim 1, wherein the reception unit receives a subframe in which the predetermined number of the physical layer pipes are stored and a preamble in which the physical layer pipe identification information is stored, and
the number of bits of the physical layer pipe presence/absence bit string is a maximum number of the physical layer pipes stored in the subframe.

3. The reception apparatus according to claim 1, wherein the holding unit further holds the plurality of bits to each of which the physical layer pipe identification information is assigned as a low level signaling (LLS) presence/absence bit string, the reception unit further receives an LLS flag of each of the predetermined number of the physical layer pipes,
the setting unit sets a value of a bit corresponding to the physical layer pipe identification information of the physical layer pipe including LLS information of the LLS presence/absence bit string to one of the two values, and a value of a bit non-corresponding to the physical layer pipe identification information of the physical layer pipe including the LLS information of the LLS presence/absence bit string to another of the two values, and
the decoding processing unit acquires the LLS information from the physical layer pipe corresponding to the bit of the one of the two values in the LLS presence/absence bit string.

4. The reception apparatus according to claim 1, wherein the holding unit further holds the plurality of bits to each of which the physical layer pipe identification information is assigned as a combination presence/absence bit string,
the reception unit further receives information regarding combination of the predetermined number of the physical layer pipes,
the setting unit sets a value of a bit corresponding to the physical layer pipe identification information of the physical layer pipe to be combined of the combination presence/absence bit string to one of the two values, and a value of a bit non-corresponding to the physical layer pipe identification information of the physical layer pipe to be combined of the combination presence/absence bit string to another of the two values, and
the decoding processing unit combines the physical layer pipe corresponding to the bit of the one of the two values in the combination presence/absence bit string.

5. The reception apparatus according to claim 1, wherein the holding unit further holds the plurality of bits to each of which the physical layer pipe identification information is assigned as an extension presence/absence bit string,
the reception unit further receives information regarding layered division multiplexing (LDM),
the setting unit sets a value of a bit corresponding to the physical layer pipe identification information of an extended physical layer pipe of the extension presence/absence bit string to one of the two values, and a value of a bit non-corresponding to the physical layer pipe identification information of the extended physical layer pipe of the extension presence/absence bit string to another of the two values, and
the decoding processing unit performs decoding using the LDM on a basis of the extension presence/absence bit string.

6. The reception apparatus according to claim 1, further comprising:
an interpretation unit that periodically interprets a preamble including the physical layer pipe identification information.

7. The reception apparatus according to claim 1, wherein the reception unit receives a frame conforming with advanced television systems committee standards (ATSC) 3.0 standard, and
the frame includes a subframe in which the predetermined number of the physical layer pipes are stored and a preamble in which the physical layer pipe identification information is stored.

8. A method for controlling a reception apparatus, the method comprising:

a reception procedure of receiving a predetermined number of physical layer pipes that do not exceed a number of bits of a physical layer pipe presence/absence bit string and physical layer pipe identification information of each of the predetermined number of the physical layer pipes;

a setting procedure of setting a value of a bit corresponding to the physical layer pipe identification information of the physical layer pipe presence/absence bit string held in a holding unit that holds a plurality of bits to each of which the physical layer pipe identification information is assigned as the physical layer pipe presence/absence bit string to one of two values, and a value of a non-corresponding bit to another of the two values; and a decoding processing procedure of performing processing of decoding a physical layer pipe of the physical layer pipes corresponding to the bit of the one of the two values.

\* \* \* \* \*